US011509702B2

(12) United States Patent
Lee et al.

(10) Patent No.: US 11,509,702 B2
(45) Date of Patent: Nov. 22, 2022

(54) METHOD AND APPARATUS FOR SELECTING AND RECEIVING STREAM IN DISTRIBUTION NETWORK-BASED MULTIMEDIA STREAMING SERVICE

(71) Applicant: Electronics and Telecommunications Research Institute, Daejeon (KR)

(72) Inventors: Changkyu Lee, Daejeon (KR); Wook Hyun, Sejong-si (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 131 days.

(21) Appl. No.: 17/010,876

(22) Filed: Sep. 3, 2020

(65) Prior Publication Data

US 2021/0160296 A1 May 27, 2021

(30) Foreign Application Priority Data

Nov. 27, 2019 (KR) .................. 10-2019-0154556

(51) Int. Cl.
*H04L 65/613* (2022.01)
*H04L 65/70* (2022.01)
*H04L 65/75* (2022.01)
*H04L 65/612* (2022.01)

(52) U.S. Cl.
CPC .......... *H04L 65/613* (2022.05); *H04L 65/612* (2022.05); *H04L 65/70* (2022.05); *H04L 65/75* (2022.05)

(58) Field of Classification Search
CPC ............. H04L 65/4092; H04L 65/4084; H04L 65/601; H04L 65/607; H04L 65/604
See application file for complete search history.

(56) References Cited

U.S. PATENT DOCUMENTS 9,432,426 B2 * 8/2016 Mao .................... H04L 65/762
9,838,452 B2    12/2017 Bae
10,313,721 B1 * 6/2019 McLeod ............ H04N 21/8456
10,645,134 B2   5/2020 Hyun et al.
(Continued)

FOREIGN PATENT DOCUMENTS

CN     101079727 A  * 11/2007
CN     103931199 A  *  7/2014  ........... G11B 27/031
(Continued)

OTHER PUBLICATIONS

Lee, Changkyu et al., "X.mp2p-ocmp: proposed modification for message examples", International Telecommunication Union, Telecommunication Standardization Sector Study Period 2017-2020, E-Meeting Sep. 2-6, 2019 (pp. 1-4).
(Continued)

*Primary Examiner* — Oanh Duong
(74) *Attorney, Agent, or Firm* — NSIP Law

(57) ABSTRACT

A method and an apparatus for selecting and receiving a stream in a distribution network-based multimedia streaming service are disclosed. According to the method, a receiving apparatus receives an index file for a channel from an index server and obtains a time difference between a current time of the receiving apparatus and the start time of the first streaming from the index file. Then, the receiving apparatus selects a fragment including a stream to be received among a plurality of fragments in which multimedia streams are divided and requests the selected fragment.

20 Claims, 12 Drawing Sheets

(56) References Cited

U.S. PATENT DOCUMENTS

| | | | |
|---|---|---|---|
| 10,667,016 B2 | 5/2020 | Hyun et al. | |
| 2008/0134258 A1 | 6/2008 | Goose et al. | |
| 2009/0282162 A1* | 11/2009 | Mehrotra | H04L 65/608 709/233 |
| 2012/0246332 A1 | 9/2012 | Lee et al. | |
| 2015/0334472 A1* | 11/2015 | Kishore | H04N 21/8549 725/32 |
| 2016/0227258 A1* | 8/2016 | Zhang | H04N 21/2183 |
| 2016/0365126 A1* | 12/2016 | Dalimba | H04N 21/8455 |
| 2017/0089996 A1* | 3/2017 | Feiweier | G01R 33/583 |
| 2017/0155697 A1* | 6/2017 | Gang | H04N 21/00 |
| 2019/0089996 A1* | 3/2019 | Surcouf | H04N 21/23424 |

FOREIGN PATENT DOCUMENTS

| | | | | |
|---|---|---|---|---|
| CN | 107707937 A | * | 2/2018 | ......... H04N 21/2387 |
| CN | 110446113 A | * | 11/2019 | |
| KR | 10-1104729 B1 | | 1/2012 | |
| KR | 10-2018-0138120 A | | 12/2018 | |
| KR | 10-2018-0138122 A | | 12/2018 | |
| WO | WO-2009103345 A1 | * | 8/2009 | ......... H04L 65/4084 |
| WO | WO-2012077982 A2 | * | 6/2012 | ........... H04N 13/167 |
| WO | WO-2018134660 A1 | * | 7/2018 | ......... H04N 21/2387 |

OTHER PUBLICATIONS

Lee, Changkyu et al., X.mp2p-ocmp: proposed modification for time-synchronized multimedia streaming, International Telecommunication Union, Telecommunication Standardization Sector Study Period 2017-2020, E-Meeting Sep. 2-6, 2019 (pp. 1-4).

* cited by examiner

FIG. 2

```
{
    "version" : 1
    "title" : "example"
    "content-id" : "855b623c-0cb5-40c1-8539-3fbb0fc1814a"
    "owner-id" : "peer12e4125fgg32"
    "overlay-id" : "945a008c-0pf0-51z0-1271-0aac1fc2080e"
    "oms-address" : "www.oms.com"
    "piece-size" : "500Kb"
    "content-type" : "stream"
    "transport" : "tcp"
}
```

FIG. 3

```
{
    "version" : 1
    "title" : "example"
    "content-id" : "655b623c-0cb5-40c1-8539-3fbb0fc1814a"
    "owner-id" : "peer12e4125fgg32"
    "overlay-id" : "945a008c-0pf0-51z0-1271-0aac1fc2080a"
    "oms-address" : "www.oms.com"
    "init-date" : "20190101"
    "init-time" : "135519"
    "GMT" : "+9"
    "keyFrame-interval-inSec" : "2"
    "bitrate" : "1Mbps"
    "encoding" : "CBR"
    "content-type" : "stream"
    "transport" : "tcp"
}
```

FIG. 4

```
{
    "version" : 1
    "title" : "example"
    "content-id" : "855b623c-0cb5-40c1-8539-3fbb0fc1814a"
    "owner-id" : "peer12a4125fgg32"
    "overlay-id" : "945a008c-0pf0-51z0-1271-6eac1fc2080a"
    "cms-address" : "www.cms.com"
    "init-date" : "20190101"
    "init-time" : "135519"
    "GMT" : "+9"
    "keyFrame-interval-inFrame" : "60"
    "frameRate" : "30"
    "bitrate" : "1Mbps"
    "encoding" : "CBR"
    "content-type" : "stream"
    "transport" : "tcp"
}
```

METHOD AND APPARATUS FOR SELECTING AND RECEIVING STREAM IN DISTRIBUTION NETWORK-BASED MULTIMEDIA STREAMING SERVICE

CROSS-REFERENCE TO RELATED APPLICATION

This application claims priority to and the benefit of Korean Patent Application No. 10-2019-0154556 filed in the Korean Intellectual Property Office on Nov. 27, 2019, the entire contents of which are incorporated herein by reference.

BACKGROUND

(a) Field

The present invention relates to a distribution network-based multimedia streaming service, and more particularly, to a method and an apparatus for selecting and receiving a stream.

(b) Description of Related Art

A distributed network-based multimedia streaming service, unlike a multimedia stream, transmits to all of users from a server on the operator's side and transmits a multimedia stream to some users from a server on the operator's side, and then the multimedia stream is shared through multimedia interworking between the users and others. The distribution network-based multimedia streaming service currently uses a method of sharing playback time information between users and comparing the shared playback time information to receive a more recently generated stream.

However, in the prior art, it is not possible to accurately determine which stream is the latest stream because it is based on the playback time information between users. In some cases, the previously generated stream may be misunderstood as the latest stream. In addition, even if the latest stream is accidentally searched for and received, normal playback may be difficult because a phenomenon such as an interruption in video or audio occurs due to the transmission speed of the stream.

The above information disclosed in this Background section is only for enhancement of understanding of the background of the invention, and therefore it may contain information that does not form the prior art that is already known in this country to a person of ordinary skill in the art.

SUMMARY

The present invention has been made in an effort to provide a method and an apparatus for selecting and receiving an optimal stream in a distribution network-based multimedia streaming service.

An exemplary embodiment of the present invention provides a method for selecting and receiving a stream in a multimedia streaming service. The method includes: receiving, by a receiving apparatus, an index file for a session from an index server, wherein the index file includes information on a start time of first streaming; obtaining, by the receiving apparatus, a time difference between a current time of the receiving apparatus and the start time of the first streaming from the index file; and selecting, by the receiving apparatus, a fragment including a stream to be received among a plurality of fragments in which multimedia streams are divided, and requesting the selected fragment.

In an implementation, the start time of the first streaming may be related to a time when a first multimedia stream is generated, and the information on the start time of the first streaming may include a time and date when the first multimedia stream is generated, and may additionally include standard time information, wherein the obtaining of a time difference may include obtaining the time difference based on the current time of the receiving apparatus and the time and date when the first multimedia stream is generated.

In an implementation, the selecting of a fragment may include: analyzing current status of fragments based on the time difference; selecting a fragment to be received by the receiving apparatus based on a result of the analyzing; and requesting the selected fragment.

In an implementation, the analyzing of the current status may represent analyzing, among the fragments of the multimedia streams provided by the channel, which fragment is the latest fragment and which fragment includes the latest stream.

In an implementation, the index file may further include a key frame generation period in units of time, wherein the analyzing of the current status may include determining the latest fragment based on the time difference and the key frame generation period in units of time.

In an implementation, the index file may further include a key frame generation period in units of frames and a number of frames per second of the multimedia streams, wherein the analyzing of the current status may include: obtaining a fragment generation period in units of time by dividing the key frame generation period in units of frames by the number of frames per second; and determining the latest fragment based on the time difference and the fragment generation period in units of time.

In an implementation, the selecting a fragment to be received by the receiving apparatus may include selecting, as a fragment to be received by the receiving apparatus, a fragment that includes a stream as close as possible to the latest stream generated by a seed, wherein the fragment including the stream is played from the time when the receiving apparatus selects and receives the fragment to the end of a service.

In an implementation, the selecting a fragment to be received by the receiving apparatus may include selecting the fragment to be received based on an available downlink bandwidth of the receiving apparatus and a bitrate of multimedia streams included in the index file.

In an implementation, the selecting a fragment to be received by the receiving apparatus may include selecting a fragment generated before the latest fragment as the fragment to be received when the available downlink bandwidth is less than a value of the bitrate.

In an implementation, the selecting a fragment to be received by the receiving apparatus may include selecting the fragment to be received by additionally considering a fragment delivery time, a fragment processing time, and a playback time when the available downlink bandwidth is greater than a value of the bitrate.

In an implementation, the selecting a fragment to be received by the receiving apparatus may include selecting the latest fragment as the fragment to be received when a time obtained by adding a fragment transmission time and a fragment processing time of a fragment transmitted after the latest fragment has a lesser predetermined value than a time obtained by adding a fragment delivery time and a fragment processing time of the latest fragment.

Another embodiment of the present invention provides an apparatus for receiving a stream in a multimedia streaming service. The apparatus includes: a network interface device configured to communicate with other devices through a network; and a processor connected with the network interface device and configured to select a stream to be received, wherein the processor may be configured to: receive an index file for a session from an index server through the network interface device, wherein the index file includes information on a start time of first streaming; obtain a time difference between a current time of the receiving apparatus and the start time of the first streaming from the index file; and select a fragment including a stream to be received among a plurality of fragments in which multimedia streams are divided and request the selected fragment through the network interface device.

In an implementation, the start time of the first streaming may be related to a time when a first multimedia stream is generated, and the information on the start time of the first streaming includes a time and date when the first multimedia stream is generated, and may additionally include standard time information, wherein the processor may be configured to obtain the time difference based on the current time of the receiving apparatus and the time and date when the first multimedia stream is generated.

In an implementation, the processor may be configured to: analyze current status of fragments based on the time difference; select a fragment to be received by the receiving apparatus based on a result of the analyzing; and request the selected fragment, wherein the analyzing of the current status may represent analyzing, among the fragments of the multimedia streams provided by the channel, which fragment is the latest fragment and which fragment includes the latest stream.

In an implementation, the index file may further include a key frame generation period in units of time, wherein the processor may be configured to determine the latest fragment based on the time difference and the key frame generation period in units of time.

In an implementation, the index file may further include a key frame generation period in units of frames and a number of frames per second of the multimedia streams, wherein the processor may be configured to: obtain a fragment generation period in units of time by dividing the key frame generation period in units of frames by the number of frames per second; and determine the latest fragment based on the time difference and the fragment generation period in units of time.

In an implementation, the processor may be configured to select the fragment to be received based on an available downlink bandwidth of the receiving apparatus and a bitrate of multimedia streams included in the index file.

In an implementation, the processor may be configured to: select a fragment generated before the latest fragment as the fragment to be received when the available downlink bandwidth is less than a value of the bitrate; and select the fragment to be received by additionally considering a fragment delivery time, a fragment processing time, and a playback time when the available downlink bandwidth is greater than a value of the bitrate.

In an implementation, the processor may be configured to select the latest fragment as the fragment to be received when a time obtained by adding a fragment delivery time and a fragment processing time of a fragment transmitted after the latest fragment has a lesser predetermined value than a time obtained by adding a fragment delivery time and a fragment processing time of the latest fragment.

BRIEF DESCRIPTION OF THE DRAWINGS

FIG. 2 shows an example of an index file.

FIG. 3 shows an example of an index file according to an exemplary embodiment of the present invention.

FIG. 4 shows another example of an index file according to an exemplary embodiment of the present invention.

DETAILED DESCRIPTION

Figure 1:
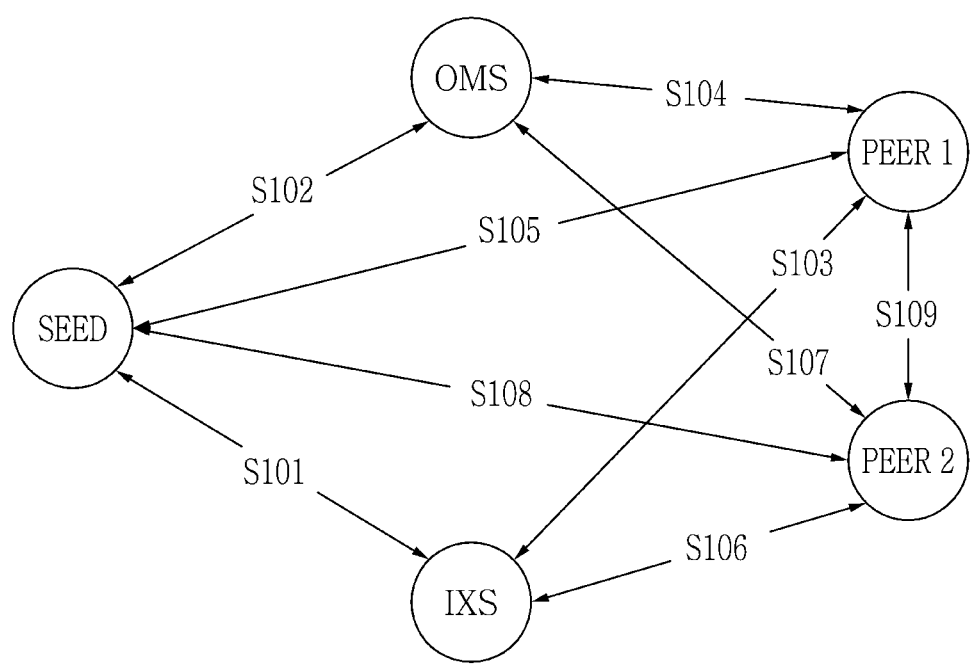
FIG. 1 shows a distribution network-based multimedia streaming service.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the specification, in addition, unless explicitly described to the contrary, the word "comprise" and variations such as "comprises" or "comprising" will be understood to imply the inclusion of stated elements but not the exclusion of any other elements.

The expressions described in the singular may be interpreted as singular or plural unless an explicit expression such as "one", "single", and the like is used.

In addition, terms including ordinal numbers such as "first" and "second" used in embodiments of the present disclosure may be used to describe components, but the components should not be limited by the terms. The terms are only used to distinguish one component from another. For example, without departing from the scope of the present disclosure, a first component may be referred to as a second component, and similarly, the second component may be referred to as the first component.

Hereinafter, a method and an apparatus for selecting and receiving a stream in a distribution network-based multimedia streaming service according to an exemplary embodiment of the present invention will be described.

FIG. 1 shows a distribution network-based multimedia streaming service.

As shown in FIG. 1, a seed which is a source of multimedia content uploads an index file by interworking with an index server (IXS) to open a multimedia streaming session (S101).

FIG. 2 shows an example of an index file.

The index file uploaded by the seed to the IXS includes, as shown in FIG. 2, version information (version), a title (title), a content identifier (content-id), an owner identifier (owner-id), an overlay identifier (overlay-id), an overlay management server (OMS) address (oms-address), a fragment size (piece-size), a content type (content-type), and a transport layer protocol (transport).

In addition, the seed may interwork with the OMS to construct an overlay network for multimedia stream distribution of the multimedia streaming session (S102).

Then, when a multimedia streaming service starts, the seed may generate a multimedia stream and divide the multimedia stream into one or more fragments. In this process, a peer (e.g., a peer 1 or a peer 2) to receive the multimedia stream may be connected to the seed through the interworking with both the IXS and an overlay management server (OMS). The peer connected to the seed or another peer receives a fragment through the interworking with each other and extracts a multimedia stream from the received fragment to watch multimedia content.

Each peer selects an appropriate fragment and receives subsequent fragments from the selected fragment in order to receive a multimedia stream corresponding to an appropriate time.

In order to provide a method for a peer to find an appropriate fragment, a seed generating a multimedia stream opens related information when uploading an index file to an index server (IXS) in an exemplary embodiment of the present invention. Particularly, the seed records information on the start time of the first streaming in the index file.

FIG. 3 shows an example of an index file according to an exemplary embodiment of the present invention.

In an example according to an exemplary embodiment of the present invention, the seed may record information on the start time of the first streaming, a key frame generation period in units of time, a bitrate of a multimedia stream, and an encoding type of a multimedia stream in the index file.

The index file according to an exemplary embodiment of the present invention, as shown in FIG. 3, includes a time (init-time) when the first multimedia stream is generated, a date (init-date) when the first multimedia stream is generated, a standard time (Greenwich Mean Time, GMT), a key frame generation period in units of time (keyFrame-interval-inSec), a bitrate of a multimedia stream (bitrate), and an encoding type of a multimedia stream (encoding). Here, the time (init-time) when the first multimedia stream is generated and the date (init-date) when the first multimedia stream is generated correspond to the information on the start time of the first streaming.

More specifically, the init-time indicates the time in the form of hhmmss when the initial multimedia stream to be distributed was created and the init-date indicates the date in the form of yyyymmdd when the initial multimedia stream to be distributed was created. Here, the initial multimedia stream corresponds to the first multimedia stream. The GMT indicates Greenwich mean time of the location where the multimedia stream is created. The value of the GMT may be set to the value between −12 and +12. The keyFrame-interval-inSec indicates the keyframe interval in second. For example, "2" means keyframe will be created in every 2 seconds. The bitrate indicates the bit rate of the multimedia stream. If encoding attribute is set to "variable bit rate (VBR)", bitrate indicates the maximum bit rate. The encoding indicates an encoding method. The value of the encoding may be constant bit rate (CBR) or VBR or other value.

In addition, the index file in FIG. 3 further includes version information (version), a title (title), a content identifier (content-id), an owner identifier (owner-id), an overlay identifier (overlay-id), an overlay management server (OMS) address (oms-address), a fragment size (piece-size), a content type (content-type), and a transport layer protocol (transport).

FIG. 4 shows another example of an index file according to an exemplary embodiment of the present invention.

In another example of an index file according to an exemplary embodiment of the present invention, the seed may record information on the start time of the first streaming, a key frame generation period in units of frames, a bitrate of a multimedia stream, and an encoding type of a multimedia stream in the index file. In other words, unlike the example in FIG. 3, the key frame generation period in units of frames is recorded instead of the key frame generation period in units of time, and the number of frames per second of the multimedia stream is also recorded.

The index file according to an exemplary embodiment of the present invention, as shown in FIG. 4, includes a time (init-time) when the first multimedia stream is generated, a key frame generation period in units of frames (keyFrame-interval-inFrame), the number of frames per second of the multimedia stream (framerate), the bitrate of a multimedia stream (bitrate), an encoding type of a multimedia stream (encoding), a date (init-date) when the first multimedia stream is generated, and a standard time (Greenwich Mean Time, GMT). Here, the time (init-time) when the first multimedia stream is generated and the date (init-date) when the first multimedia stream is generated correspond to the information on the start time of the first streaming.

More specifically, the keyFrame-interval-inFrame indicates the keyframe interval in frame. For example, "60" means keyframe will be created in every 60 frames. The frameRate indicates the frame rate of the multimedia stream. For a description of the init-time, the init-date, the GMT, and the encoding, refer to the description of FIG. 3 above.

In addition, the index file in FIG. 4 further includes version information (version), a title (title), a content identifier (content-id), an owner identifier (owner-id), an overlay identifier (overlay-id), an overlay management server (OMS) address (oms-address), a fragment size (piece-size), a content type (content-type), and a transport layer protocol (transport).

The index file is based on information related to fragmentation of a multimedia stream.

Figure 5:
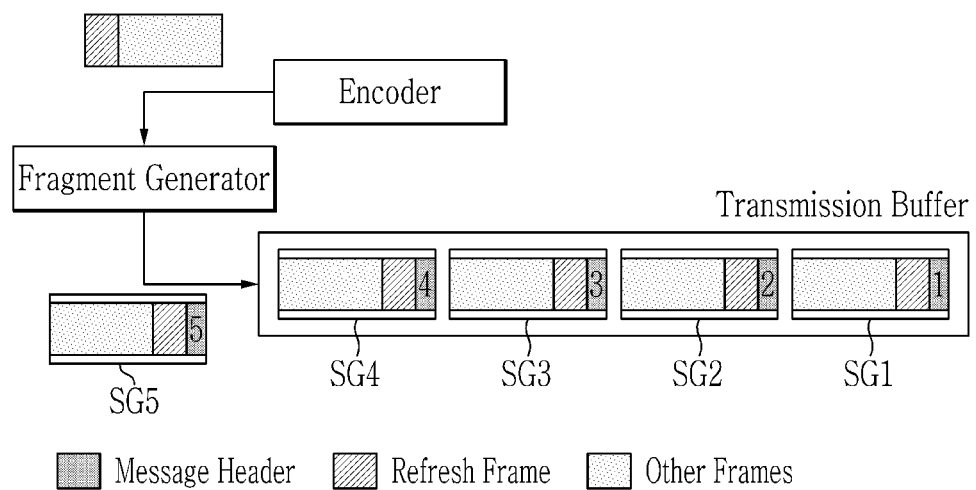
FIG. 5 is an exemplary diagram showing fragmentation of a multimedia stream according to an exemplary embodiment of the present invention.

FIG. 5 is an exemplary diagram showing fragmentation of a multimedia stream according to an exemplary embodiment of the present invention.

In FIG. 5, for the convenience of description, the detailed processing of video and audio is not shown, and the fragmentation of the multimedia stream is simplified.

When an encoded multimedia stream is provided from an encoder, a fragment generator divides the encoded multimedia stream into one or more fragments (SG1-SG5). At this time, as shown in FIG. 5, all fragments (SG1-SG5) have the same size. Each fragment includes a message header and a refresh frame which is a key frame, and further includes other frames to be played. Each fragment (SG1-SG5) generated by the fragment generator is stored in a transmission buffer.

Figure 6:
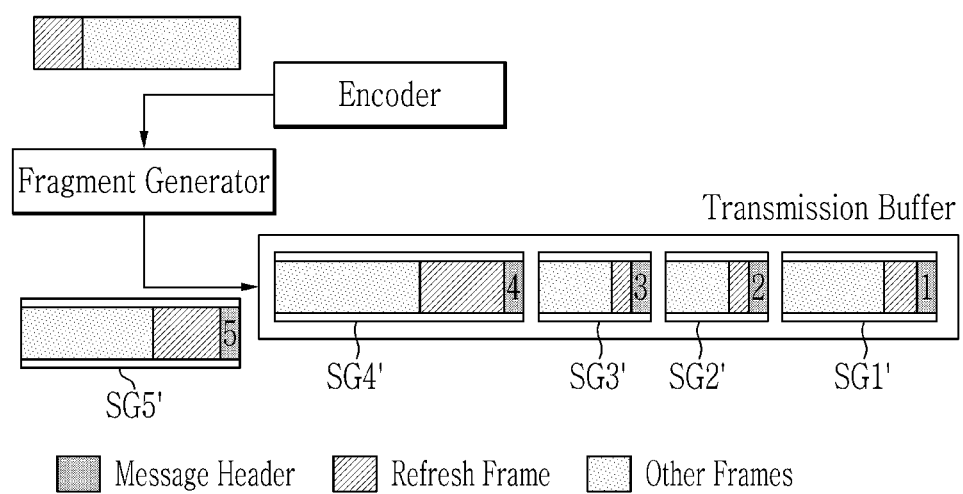
FIG. 6 is another exemplary diagram showing fragmentation of a multimedia stream according to an exemplary embodiment of the present invention.

FIG. 6 is another exemplary diagram showing fragmentation of a multimedia stream according to an exemplary embodiment of the present invention.

Unlike the fragmentation in FIG. 5, a fragment having a different size may be generated. For example, as shown in FIG. 6, a fragment generator divides the multimedia stream into one or more fragments (SG1'-SG5'). At this time, the size of each fragment (SG1'-SG5') may be different. In an example, when an encoder uses a constrained variable bit rate (CVBR) scheme, the fragment generator may divide the multimedia stream into fragments having different sizes. If the CVBR is used as an encoding scheme, the value of the encoding type in the index file may be set as a CVBR value. Even if the value of the encoding type is set as a CVBR value, a multimedia stream data part of each fragment has to start with a key frame in a form of a refresh frame so that each fragment may be independently played.

In an exemplary embodiment of the present invention, when the seed divides each multimedia stream into one or more fragments, the index file is generated assuming that all fragments have the same size and can be played independently. That is, the multimedia stream data of each fragment starts with a key frame, the key frame exists in a form of a refresh frame such as an IDR frame in H.264 to be played independently, and it is assumed that frames after the key frame do not refer to frames before the key frame. However, the present invention is not limited thereto.

A multimedia streaming service method according to an exemplary embodiment of the present invention will now be described.

Figure 7:
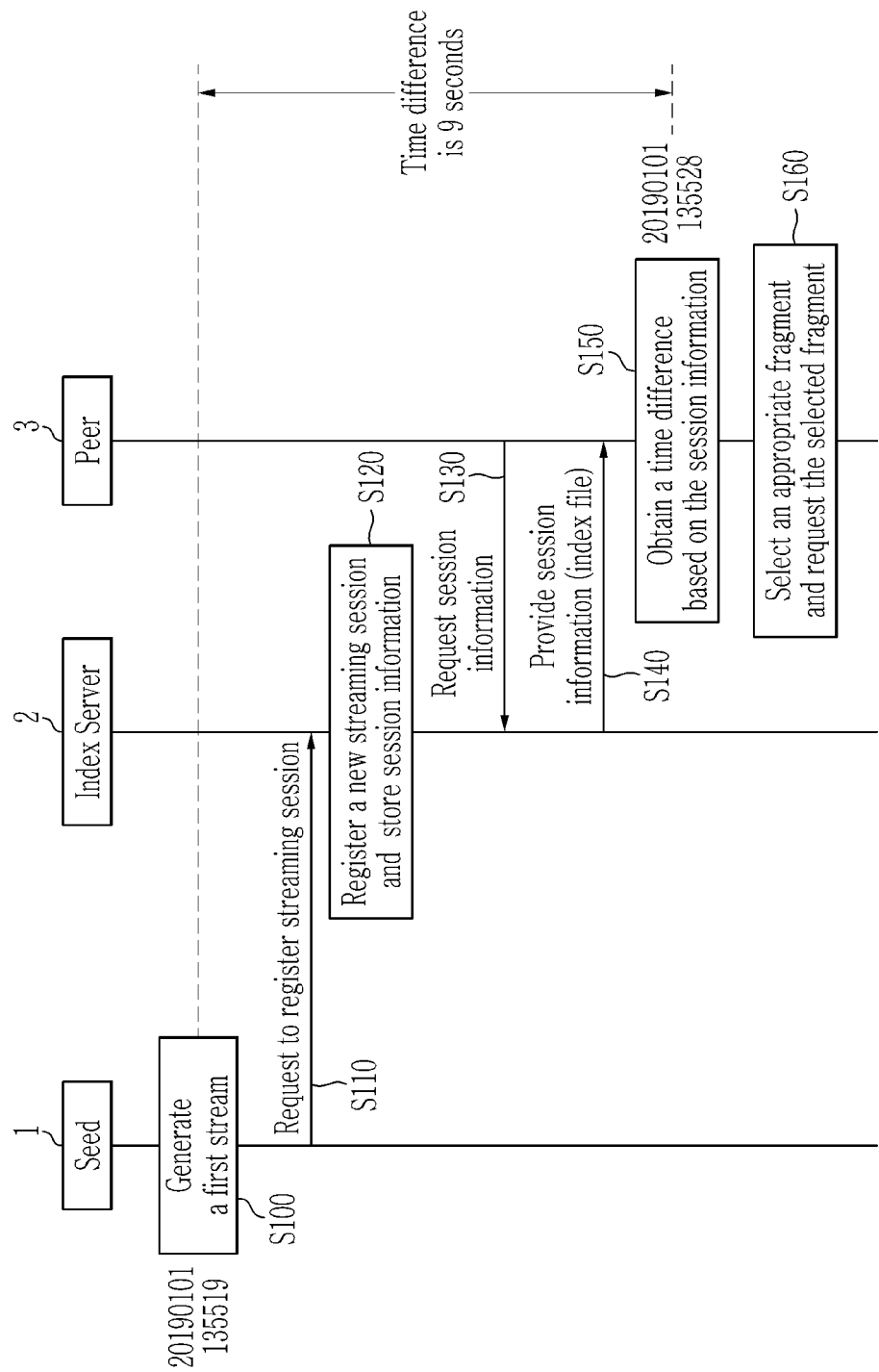
FIG. 7 shows a flowchart of a multimedia streaming service method according to an exemplary embodiment of the present invention.

FIG. 7 shows a flowchart of a multimedia streaming service method according to an exemplary embodiment of the present invention.

As shown in FIG. 7, a seed 1 generates a multimedia stream to be distributed (S100). That is, a first stream is created.

The seed 1 registers its streaming session by sending a request including the information on its streaming session to an index server (IXS) 2 (S110). The information on its streaming session, that is, the session information includes an index file including information on the start time of the first streaming. The index server 2 registers a new streaming session according to the request from the seed 1 and stores the session information including the index file in correspondence to the registered streaming session (S120).

After this, a peer 3 to receive a multimedia stream requests, from the index server 2, information on a session to which it wants to subscribe (S130). Accordingly, the index server 2 provides the information on the session to the peer 3 (S140). Then, the peer 3 receives the session information, that is, the index file including the information on the session and obtains a time difference based on the index file (S150). That is, the peer 3 obtains a time difference between the current time and the start time of the first streaming.

The peer 3 analyzes the current status of fragments based on the time difference, selects an appropriate fragment based on the result of analyzing, and requests the selected fragment (S160).

The operation of the peer in the multimedia streaming service method according to an embodiment of the present invention will be described in more detail as follows.

Figure 8:
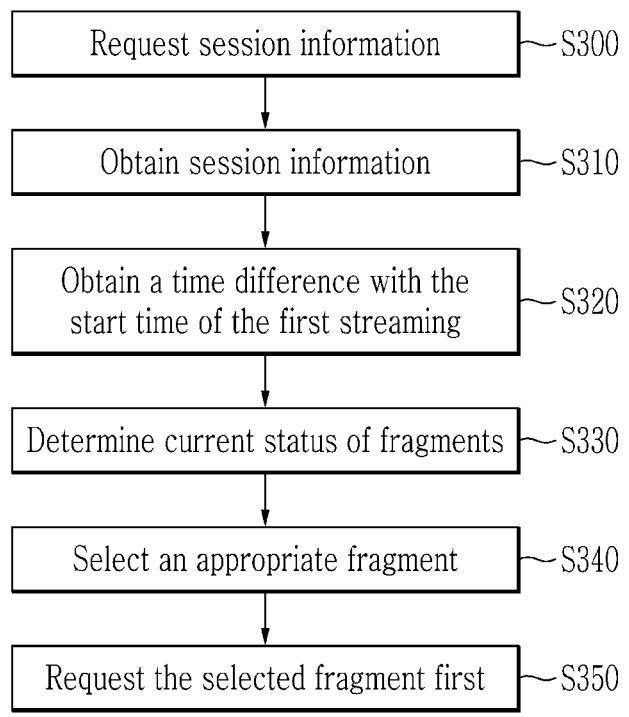
FIG. 8 shows a flowchart of a method for selecting and receiving a stream in a distribution network-based multimedia streaming service.

FIG. 8 shows a flowchart of a method for selecting and receiving a stream in a distribution network-based multimedia streaming service.

The method in FIG. 8 is performed by a peer. The peer operates to receive a multimedia streaming service from the appropriate time zone as follows.

As shown in FIG. 8, the peer requests session information from the index server (IXS) (S300). According to the session information request, the index server (IXS) provides the session information including the index file to the peer. Here, the index file may include the information as in FIG. 3 or FIG. 4.

After requesting the session information, the peer obtains the index file from the index server (IXS) (S310). The peer obtains the information on the start time of the first streaming from the index file and obtains the time difference between the current time and the start time of the first streaming (S320). For example, the start time of the first streaming is obtained by using the time (init-time) when the first multimedia stream is generated, the date (init-date) when the first multimedia stream is generated, and the standard time (Greenwich Mean Time, GMT) in the index file. Then, the time difference between the current time and the start time of the first streaming is obtained.

In addition, the peer analyzes the current status of fragments (the status of fragment generation) based on the information included in the index file (S330).

Then, the peer analyzes the status of fragments based on the results of the analyzing to select a fragment that is most appropriate for the peer (S340), and communicates with other peers so that the selected fragment may be first received (S350). The selection of appropriate fragments will be described in more detail later.

In the receiving method performed as described above, a method of analyzing the current status of the fragments will be described in more detail.

Here, it is assumed that the time between a peer and a seed is synchronized, and the time synchronization may be performed through a network time protocol and the like.

For example, it is assumed that a seed generates the first multimedia stream and the start time when the first multimedia stream is first streaming is "Jan. 1, 2019 at 13:55:19 (20190101135519)" (see FIG. 7). The information on the start time of the first streaming is recorded in the index file. For example, the value of the date (init-date) when the first multimedia stream is generated is recorded as "20190101", the value of the time (init-time) when the first multimedia stream is generated is recorded as "135519", and the value of the standard time (GMT) is recorded as "+9".

As above, a peer receives the index file of the session and obtains the time difference between the current time and the start time of the first streaming. For example, it is assumed that the current time is "Jan. 1, 2019 at 13:55:28 (20190101135528)". The peer first understands that the start time of the first streaming is "20190101" based on the date (init-date) value of "20190101" and the time (init-time) value of "135519". Then, the time between the current time (20190101135528) and the start time of the first streaming (20190101135528) that is, "9", is obtained. Accordingly, it is known that the time difference between the current time and the start time of the first streaming is "9" (see FIG. 7). It should be noted that the example assumes a seed and a peer are in same GMT. Then, the current status of fragments is understood based on the time difference. Here, the understanding of the current status means determining which fragment is the latest and which fragment includes the latest stream among the fragments provided by a channel. For this, the peer uses a key frame generation period in units of time or uses a key frame generation period in units of frames and the number of frames per second provided in the index file.

Specifically, if a key frame generation period in units of time (KeyFrame-interval-inSec) is provided in the index file (See FIG. 3) and the value of KeyFrame-interval-inSec is n, the peer directly knows that a fragment is generated in every n seconds. Then, the peer may know which fragment includes the latest stream by using the time difference between the current time and the start time of the first streaming and the key frame generation period in units of time. For example, when a key frame is generated every 2 seconds (the value of the KeyFrame-interval-inSec is "2") and the time difference between the current time and the start time of the first streaming is 9 seconds, the current status indicating that the fourth fragment is the latest fragment and the fifth fragment including the latest stream is being generated is determined.

Unlike this, if a key frame generation period in units of frames (keyFrame-interval-inFrame) and the number of frames per second (framerate) are provided in the index file (Referring to FIG. 4), the peer calculates a fragment interval that is, the peer obtains a fragment generation period in units of time by dividing the key frame generation period in units of frames by the number of frames per second. For example, when the number of frames per second is 30 frames (the value of the framerate is 30) and one key frame is generated per 60 frames (the value of the keyFrame-interval-inFrame is 60), it is known that a key frame is generated every 2 seconds (the fragment generation period in units of time is "2"). Accordingly, a key frame is generated every 2 seconds and the time difference between the current time and the start time of the first streaming is 9 seconds, and then the current status indicating that the forth fragment is the latest fragment and the fifth fragment including the latest stream is being generated is determined. The latest fragment represents the most recently generated and provided fragment stream. After calculating the time difference and checking the status of fragment generation, the peer knows the total amount of fragments. In other words, the peer knows the fragment number of the latest fragment.

The method in which the peer having determined the current status (the status of fragment generation) as the above described selects the appropriate fragments will be described. The peer having determined the current status selects a fragment appropriate to the peer among the latest fragments or the fragments generated before the latest fragment. Here, the appropriate fragment represents fragments that have no problem in playback from the time when the peer selects and receives the corresponding fragment to the end of the service and that include a stream as close as possible to the latest stream generated by the seed.

In order to select the appropriate fragment, the peer considers various parameters. In an implementation, the peer may select the appropriate fragment in consideration of the available downlink bandwidth, and in addition, may select the appropriate fragment in consideration of the key frame generation period, the bitrate of the multimedia, and the like.

In another implementation, the peer may select the appropriate fragment in consideration of the size of a fragment, the period for generating a fragment and the bit rate of a multimedia stream. For example, the size of a fragment may be referred to calculate the expected delivery time of a fragment. By using the size of a fragment and available downlink capacity of a peer, the peer may calculate the expected delivery time. The available downlink capacity is already known by peers, but the peer needs to refer session characteristics for acquiring the size of a fragment. If encoding attribute is set to "CBR", then the peer may refer piece-size attribute directly. However, the piece-size attribute will not exist, if encoding attribute is set to "VBR". The peer deduces the size of a fragment by referring bitrate attribute and the period for generating a fragment. The deduced fragment size may be used to deduce the expected delivery time of a fragment. Note that a fragment #n+1 needs to arrive at least during a fragment #n is being played back. Thus, the expected delivery time of a fragment needs to be smaller than the play back time of a fragment. The time for processing a received fragment also needs to be considered. As another example, the peer may compare its available downlink capacity and the bit rate of multimedia stream. If its available downlink capacity is higher than the bit rate of multimedia stream, the peer may request the latest fragment.

A method for selecting an appropriate fragment in consideration of parameters will be described as follow.

For example, if the key frame generation period is 2 seconds and the bitrate of the multimedia stream is 1 Mbps, each fragment may be said to have a size of 2M. It means that if the peer starts playing after receiving a fragment, the next fragment needs to be prepared within 2 seconds, so that the available downlink bandwidth of the peer should be at least 1 Mbps. The condition that it should be able to receive at 1 Mbps may be premised on the possibility of receiving fragments at 1 Mbps or more from a seed or other peers. However, if it may receive at 1 Mbps, it may not select the latest fragment. This is because it is necessary to consider not only the key frame generation period and the transmission time, but also the time for processing fragments at the transmitting and receiving end. That is, there is a time it takes for the seed side to generate and transmit fragments after receiving the multimedia stream, and a time it takes for the peer side to receive the fragments and play the multimedia stream in the fragments (for example, a time it takes to deliver fragments to a playing unit of the peer after receiving the fragments). Thus, all of these times should be considered.

In an exemplary embodiment of the present invention, considering the above, it is possible to select an appropriate fragment as follows.

If the key frame generation period is $T_{KEY}$, the bitrate of the multimedia stream is $B_{MUL}$, the time it takes for a peer to request and receive a fragment having the desired stream is referred to as $T_{PROC}$, the time is takes for the peer to extract the multimedia stream from the fragment and play the multimedia stream is referred to as $T_{PLAY}$, and the bandwidth available to receive the fragment is $B_{RECV}$, the size of each fragment is $S_{PIECE} = T_{KEY} * B_{MUL}$, and the fragment delivery time is $T_{TRANS} = S_{PIECE} / B_{RECV}$.

After determining the current status of the fragments as above, the peer determines whether the following condition is satisfied for the latest fragment $P_i$ and the next fragment $P_{i+1}$.

$$T_{RANS} \text{ of } {}_{Pi+1} + T_{PROC} \text{ of } {}_{Pi+1} < T_{RANS} \text{ of } {}_{Pi} + T_{PROC} \text{ of } {}_{Pi} + T_{PLAY} \text{ of } {}_{Pi} \quad \text{Equation 1}$$

When the condition is satisfied, the peer selects the corresponding fragment, that is, the latest fragment $P_i$, as the appropriate fragment to be received.

Meanwhile, if $P_{i+1}$ is not received until after Pi has finished playing, it is determined whether the following condition is satisfied for $P_{i+1}$ and the next fragment $P_{i+2}$ rather than $P_i$.

$$T_{RANS} \text{ of } {}_{Pi+2} + T_{PROC} \text{ of } {}_{Pi+2} < (T_{RANS} \text{ of } {}_{Pi+1} + T_{PROC} \text{ of } {}_{Pi+1} + T_{PLAY} \text{ of } {}_{Pi+1}) + (T_{RANS} \text{ of } {}_{Pi} + T_{PROC} \text{ of } {}_{Pi} + T_{PLAY} \text{ of } {}_{Pi}) \quad \text{Equation 2}$$

When the condition is satisfied, the peer selects the corresponding fragment, that is, the $P_{i+1}$, as the appropriate fragment to be received.

Summarizing the above, the peer repeats the process of determining whether the following conditions are satisfied starting from 1 until j is found.

$$T_{RANS} \text{ of } _{Pi+j} + T_{PROC} \text{ of } _{Pi+j} < \sum_{k=0}^{j-1}(T_{RANS} \text{ of } _{Pi+k} + T_{PROC} \text{ of } _{Pi+k} + T_{PLAY} \text{ of } _{Pi+k}) + \text{a predetermined time value} \quad \text{Equation 3}$$

Here, the predetermined time value is a value that may be arbitrarily set for flexible operation.

When the j satisfying the condition according to Equation 3 is found, the j−1th fragment is received. Accordingly, an appropriate fragment may be selected so that the next fragment can be received before the playing of the previous fragment is completed.

When an adaptive bit rate (ABR) service in which it is possible to select and view one from multimedia streams having various quality is provided, the appropriate fragment may be selected based on the manifest file provided during the service, and the overlay network to be joined may also be selected. However, the specific method for the ABR service is not covered in the present invention.

Figure 9:
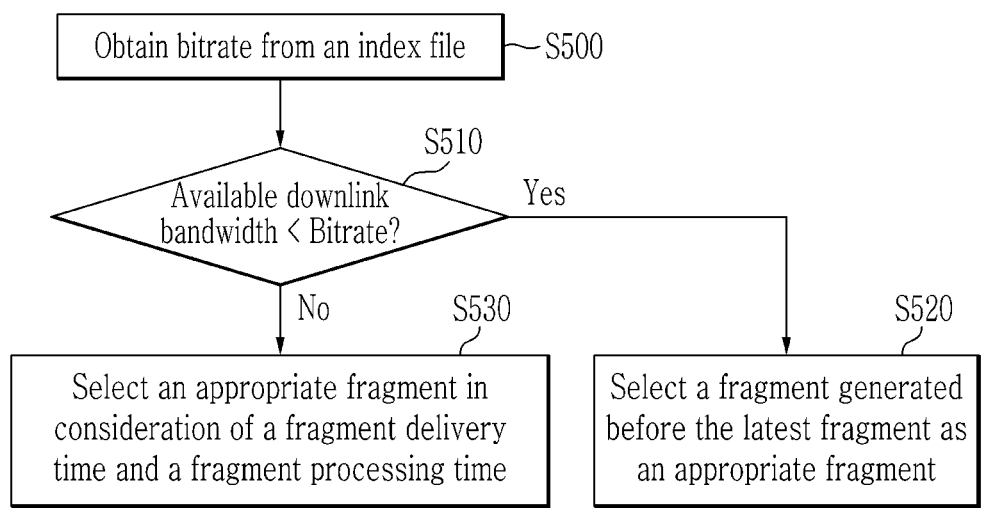
FIG. 9 shows a flowchart of a method for a peer to select a fragment according to an exemplary embodiment of the present invention.

FIG. 9 shows a flowchart of a method for a peer to select a fragment according to an exemplary embodiment of the present invention.

In order to select an appropriate fragment based on the current status of fragments, the peer obtains a bitrate from an index file (S500).

The peer compares its downlink capacity, that is, its own available downlink bandwidth and the bitrate included in the index file (S510).

When the available downlink bandwidth is less than (or less than or equal to) the value of the bitrate included in the index file, the fragment generated before the latest fragment is selected as an appropriate fragment (S520). Here, if the ABR service is provided, the comparison with the bitrate of the multimedia stream corresponding to the appropriate quality base on the manifest file may be further performed.

Meanwhile, when the available downlink bandwidth is greater than (or greater than or equal to) the value of the bitrate included in the index file, the peer determines that the available downlink bandwidth is large enough and selects an appropriate fragment based on the fragment delivery time and the fragment processing time (S530).

Figure 10:
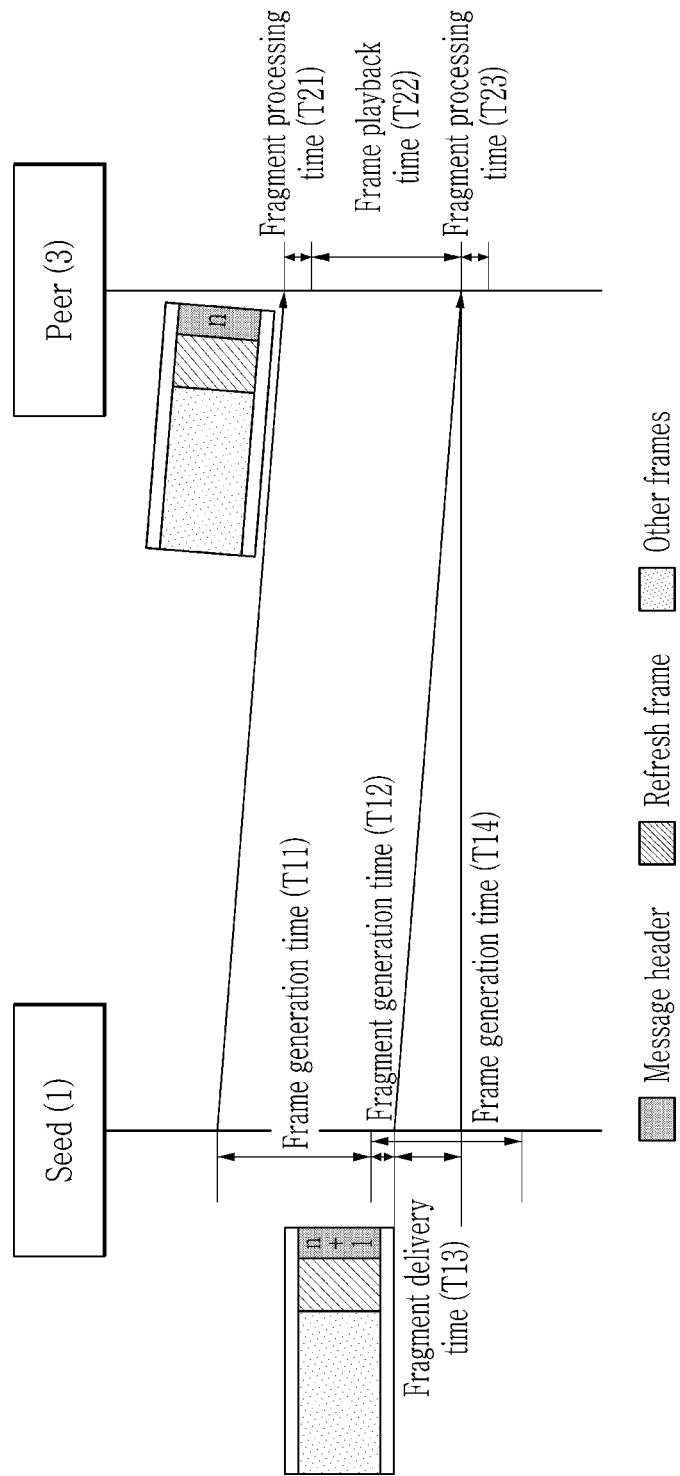
FIG. 10 is an exemplary diagram showing fragment transmission according to an exemplary embodiment of the present invention.

FIG. 10 is an exemplary diagram showing fragment transmission according to an exemplary embodiment of the present invention.

It is assumed that a peer 3 receives the nth fragment which is the latest fragment and that there are frames which may be played for 2 seconds in the corresponding fragment. The n+1th fragment needs to arrive at the peer 3 before the peer 3 processes the nth fragment. Thus, in consideration of the time for a seed 1 to generate a fragment and the peer 3 to receive and process the fragment, the time it takes for the next fragment to be transmitted from the seed 1 to the peer 3 should be short enough. For example, as shown in FIG. 10, in consideration of a fragment generation time T12 which is the time until a fragment is generated after a frame generation time T11, a fragment processing time T23 which is the time until a fragment is processed after the fragment has been received by a peer, and a fragment processing time T21 and a playback time T22 which are the times that the previous fragment is processed and played, a fragment delivery time T13 which is the time it takes for a fragment generated by a seed until the fragment is transmitted should be short enough.

Accordingly, when the fragment delivery time is short enough in consideration of the time for processing fragments in the step of S530 (for example, the time obtained by adding the fragment delivery time T13 and the fragment processing time T 23 which correspond to the n+1th fragment has a lesser predetermined value than the time obtained by the fragment processing time T21 and the frame playback time T22 which correspond to the latest fragment (the nth fragment), wherein T13 corresponds to $T_{RANS}$ in the equations, T21 and T23 correspond $T_{PROC}$ in the equations, and T22 corresponds $T_{PLAY}$ in the equations), the latest fragment (the nth fragment) is selected as an appropriate fragment. In other words, if the available downlink bandwidth of a peer is greater than the value of the bitrate in the index file and each fragment may be received in a short enough time, the latest fragment is selected as an appropriate fragment.

However, because of the nature of distributed networking, it is possible to receive a fragment by relay transmission without receiving the fragment directly from a seed, so the receiving time of the fragment may be longer. In consideration of this, in order to receive a fragment more stably, a fragment before the latest fragment may be selected as an appropriate fragment. For example, when the latest fragment is the nth fragment, the n−1th fragment or the n−2th fragment may be selected as an appropriate fragment. Description of this will be given with reference to the above, and detailed description is omitted here.

In this way, the peer selects a fragment to start receiving, and then communicates with a seed or other peers to perform an operation for receiving the fragment.

Figure 11:
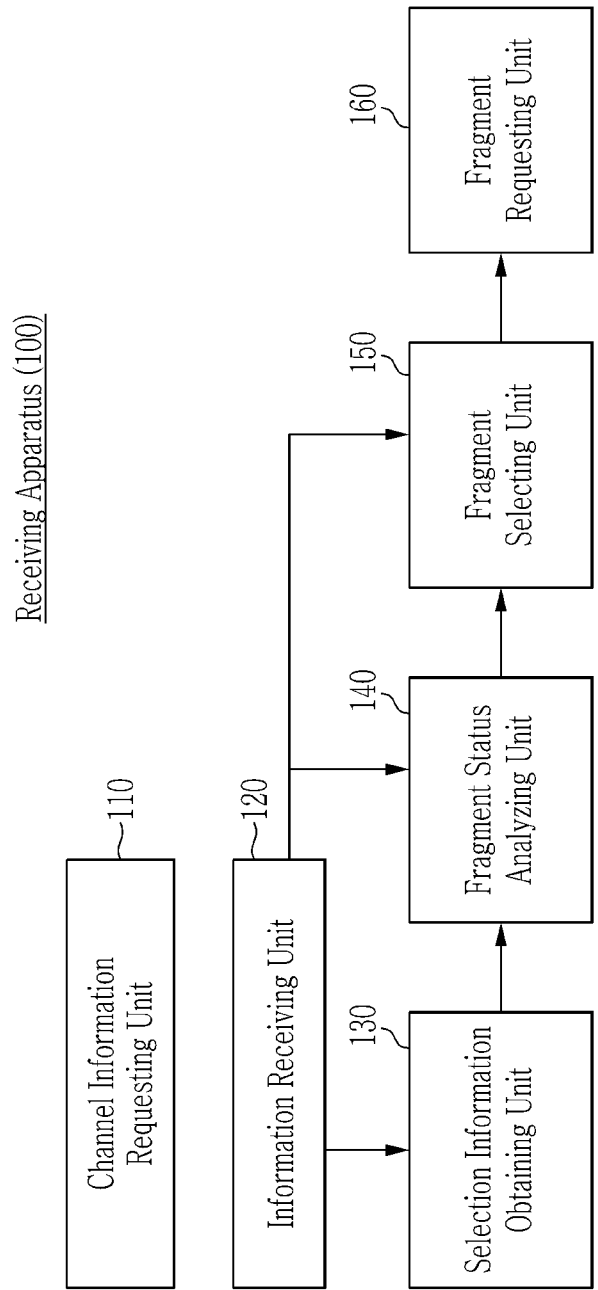
FIG. 11 is a structural diagram of a receiving apparatus according to an exemplary embodiment of the present invention.

FIG. 11 is a structural diagram of a receiving apparatus according to an exemplary embodiment of the present invention.

The receiving apparatus 100 according to an exemplary embodiment of the present invention includes a channel information requesting unit 110, an information receiving unit 120, a selection information obtaining unit 130, a fragment status analyzing unit 140, a fragment selecting unit 150, and a fragment requesting unit 160.

The channel information requesting unit 110 is configured to request channel information from an index server.

The information receiving unit 120 is configured to receive the requested information from the index server. The information receiving unit 120 receives an index file corresponding to the channel information request from the index server.

The selection information obtaining unit 130 is configured to obtain information (selection-based information) for fragment selection based on the received information. Specifically, the selection information obtaining unit 130 is configured to obtain the start time of the first streaming and obtain the time difference between the current time of the receiving apparatus 100 and the start time of the first streaming as the selection-based information.

The fragment status analyzing unit 140 is configured to analyze the current status of fragments transmitted from a seed based on the information obtained by the selection information obtaining unit 130. The fragment status analyzing unit 140 determines which fragment is the latest fragment and which fragment includes the latest stream based on the time difference between the current time and the start time of the first streaming and the index file.

The fragment selecting unit 150 is configured to select an appropriate fragment among the latest fragment or the fragments before the latest fragment based on the result of analyzing by the fragment status analyzing unit 140 and environment information of the receiving apparatus 100. Here, the environment information includes the available downlink bandwidth and may further include the key frame generation period, the bitrate of the multimedia stream, and the like.

The fragment requesting unit 160 is configured to request the fragment selected by the fragment selecting unit 150 from other devices (for example, a seed or other peers) and to receive it.

The specific operation of each of the units 110 to 160 of the receiving apparatus 100 refers to the method embodiment described above, and a detailed description is omitted here. The receiving apparatus 100 having such a structure may be implemented in a form included in a peer.

Figure 12:
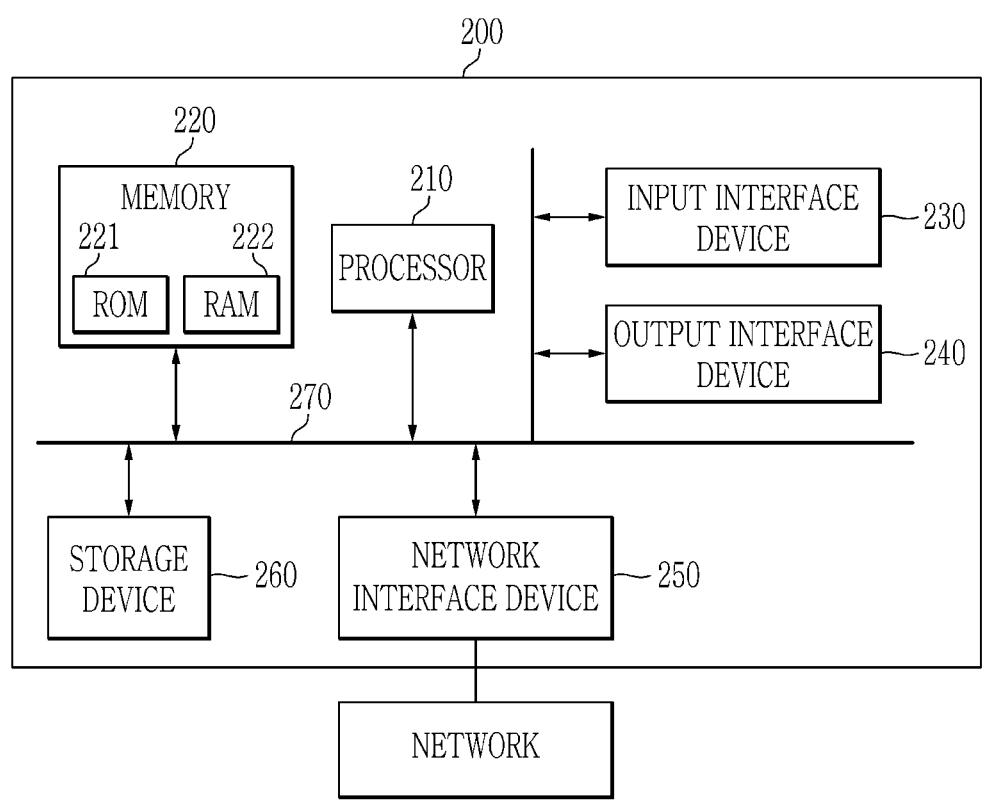
FIG. 12 is a structural diagram of a receiving apparatus according to another exemplary embodiment of the present invention.

FIG. 12 is a structural diagram of a receiving apparatus according to another exemplary embodiment of the present invention.

As shown in FIG. 12, a receiving apparatus 200 according to an exemplary embodiment of the present invention includes a processor 210, a memory 220, an input interface device 230, an output interface device 240, a network interface device 250, and a storage device 260 which communicate with each other through a bus 270.

The processor 210 may be configured to embody the methods described with reference to FIGS. 3 to 11. For example, the processor 210 may be configured to perform the functions of the selection information obtaining unit, the fragment status analyzing unit, the fragment selecting unit, and the fragment requesting unit.

The processor 210 may be a central processing unit (CPU) or a semiconductor device which executes commands stored in the memory 220 or the storage device 260.

The memory 220 is connected to the processor 210 and stores various information related to an operation of the processor 210. The memory 220 may store instructions which may be executed by the processor 210 or load the instructions from the storage device 260 to temporarily store the instructions. The processor 210 may execute the instructions which are stored in the memory 220 or loaded from the memory. The memory may include a read only memory (ROM) 221 and a random access memory (RAM) 222.

According to an exemplary embodiment of the present invention, the memory 220/the storage device 260 may be located inside or outside the processor 210 or may be connected to the processor 210 through various known units.

The input interface device 230 may be configured to receive image data photographed by one imaging device and provide the image data to the processor 210. The output interface device 230 may be configured to output the result of processing by the processor 210.

The network interface device 250 is connected to the network to be configured to transmit/receive a signal. The network interface device 250 is connected to send data input through the network to the processor 210 or to transmit the result of processing by the processor 210 to other apparatuses through the network. For example, the processor 210 may be configured to perform the functions of the channel information requesting unit, the information receiving unit, and the fragment requesting unit.

According to an exemplary embodiment of the present invention, it is possible to select an appropriate stream for smooth playback in a distributed network-based multimedia streaming service. In particular, a peer may determine the current status of the latest stream, identify information about the fragments including the stream appropriate to itself, and also select and receive the fragments including the stream appropriate to itself based on various environment information of the peer.

Therefore, according to the configuration of the present invention, a user can receive the latest stream that can be played smoothly, and synchronization of playing between users can also be expected.

The components described in the exemplary embodiments may be implemented by hardware components including, for example, at least one digital signal processor (DSP), a processor, a controller, an application-specific integrated circuit (ASIC), a programmable logic element such as an FPGA, other electronic devices, or combinations thereof. At least some of the functions or the processes described in the exemplary embodiments may be implemented by software, and the software may be recorded on a recording medium. The components, the functions, and the processes described in the exemplary embodiments may be implemented by a combination of hardware and software.

The method according to exemplary embodiments may be embodied as a program that is executable by a computer, and may be implemented as various recording media such as a magnetic storage medium, an optical reading medium, and a digital storage medium. Various techniques described herein may be implemented as digital electronic circuitry, or as computer hardware, firmware, software, or combinations thereof. The techniques may be implemented as a computer program product, i.e., a computer program tangibly embodied in an information carrier, e.g., in a machine-readable storage device (for example, a computer-readable medium) or in a propagated signal for processing by, or to control an operation of a data processing apparatus, e.g., a programmable processor, a computer, or multiple computers. A computer program(s) may be written in any form of a programming language, including compiled or interpreted languages, and may be deployed in any form including a stand-alone program or a module, a component, a subroutine, or other units appropriate for use in a computing environment. A computer program may be deployed to be executed on one computer or on multiple computers at one site or distributed across multiple sites and interconnected by a communication network. Processors appropriate for execution of a computer program include, by way of example, both general and special purpose microprocessors, and any one or more processors of any kind of digital computer. Generally, a processor will receive instructions and data from a read-only memory or a random access memory or both. Elements of a computer may include at least one processor to execute instructions and one or more memory devices to store instructions and data. Generally, a computer will also include or be coupled to receive data from, transfer data to, or perform both on one or more mass storage devices to store data, e.g., magnetic disks, magneto-optical disks, or optical disks. Examples of information carriers appropriate for embodying computer program instructions and data include semiconductor memory devices, for example, magnetic media such as a hard disk, a floppy disk, and a magnetic tape, optical media such as a compact disk read only memory (CD-ROM), a digital video disk (DVD), etc., and magneto-optical media such as a floptical disk, and a read only memory (ROM), a random access memory (RAM), a flash memory, an erasable programmable ROM (EPROM), and an electrically erasable programmable ROM (EEPROM), and any other known computer readable medium. A processor and a memory may be supplemented by, or integrated into, a special purpose logic circuit. The processor may run an operating system (OS) and one or more software applications that run on the OS. The processor device also may access, store, manipulate, process, and create data in response to execution of the software. For the purpose of simplicity, the description of a processor device is used as singular; however, one skilled in the art will appreciate that a processor device may include multiple processing elements and/or multiple types of processing elements. For example, a processor device may include multiple processors or a processor and a controller. In addition, different processing configurations are possible, such as parallel processors. Also, non-transitory computer-readable media may be any available media that may be accessed by a computer, and may include both computer storage media and transmission media. The present specification includes details of a number of specific implements, but it should be understood that the details do not limit any invention or what is claimable in the specification but rather describe features of the specific exemplary embodiment. Features described in the specification in the context of individual exemplary embodiments may be implemented as a combination in a single exemplary embodiment. In contrast, various features described in the specification in the context of a single exemplary embodiment may be implemented in multiple exemplary embodiments individually or in an appropriate sub-combination. Furthermore, the features may operate in a specific combination and may be initially described as claimed in the combination, but one or more features may be excluded from the claimed combination in some cases, and the claimed combination may be changed into a sub-combination or a modification of a sub-combination. Similarly, even though operations are described in a specific order in the drawings, it should not be understood as the operations needing to be performed in the specific order or in sequence to obtain desired results or as all the operations needing to be performed. In a specific case, multitasking and parallel processing may be advantageous. In addition, it should not be understood as requiring a separation of various apparatus components in the above-described exemplary embodiments in all exemplary embodiments, and it should be understood that the above-described program components and apparatuses may be incorporated into a single software product or may be packaged in multiple software products. It should be understood that the exemplary embodiments disclosed herein are merely illustrative and are not intended to limit the scope of the invention. It will be apparent to one of ordinary skill in the art that various modifications of the exemplary embodiments may be made without departing from the spirit and scope of the claims and their equivalents.

What is claimed is:

1. A method for selecting and receiving a stream in a multimedia streaming service, comprising:
   requesting, by a receiving apparatus, information on a streaming session from an index server;
   receiving, by the receiving apparatus, session information from the index server;
   calculating, by the receiving apparatus, a time difference based on the session information; and
   checking, by the receiving apparatus, a status of fragment generation based on the time difference;
   selecting, by the receiving apparatus, an appropriate fragment based on the status of fragment generation; and
   requesting, by the receiving apparatus, fragments from the selected appropriate fragment.

2. The method of claim 1, wherein
the session information includes a time when an initial multimedia stream to be distributed is created, a date when the initial multimedia stream to be distributed is created, and a Greenwich mean time (GMT), wherein
the calculating of a time difference comprises
calculating the time difference based on the time, the date and the GMT.

3. The method of claim 2, wherein
the calculating of a time difference comprises
calculating the time difference by comparing the time when the multimedia stream to be distributed is created with a current time of the receiving apparatus based on the date and the GMT.

4. The method of claim 2, wherein
the session information further includes data related to a keyframe interval, wherein
the checking of a status of fragment generation comprises
knowing a period for generating a fragment based on the data; and
determining a latest fragment based on the time difference and the period for generating a fragment.

5. The method of claim 4, wherein
the data related to a keyframe interval is a keyFrame-interval-inSec that indicates a keyframe interval in second and a value of the KeyFrame-interval-inSec is n, wherein
the knowing of a period for generating a fragment comprises
knowing the period for generating a fragment in which a fragment is created in every n seconds based on the keyFrame-interval-inSec.

6. The method of claim 4, wherein
the data related to a keyframe interval is a framerate and a keyFrame-interval-inFrame that indicates a keyframe interval in frame, wherein
the knowing of a period for generating a fragment comprises
obtaining the period for generating a fragment by dividing the keyFrame-interval-inFrame by the framerate.

7. The method of claim 4, wherein
the session information further includes a bit rate of a multimedia stream, wherein
the selecting of an appropriate fragment comprises
selecting an appropriate fragment in consideration of a size of a fragment, the period for generating a fragment and the bit rate of a multimedia stream.

8. The method of claim 7, wherein
the session information further includes an encoding type, wherein
the selecting of an appropriate fragment further comprises
deducing the size of a fragment by referring the period for generating a fragment and the bit rate of a multimedia stream according to the encoding type.

9. The method of claim 8, wherein
the selecting of an appropriate fragment comprises
deducing an expected delivery time of a fragment based on the size of a fragment and its available downlink bandwidth; and
selectin an appropriate fragment based on the expected delivery time of a fragment.

10. The method of claim 9, wherein
the selecting of an appropriate fragment based on the expected delivery time of a fragment comprises
selecting an appropriate fragment according to the expected delivery time of a fragment so that a next fragment is received before playing of a previous fragment is completed.

11. The method of claim 10, wherein
the selecting an appropriate fragment according to the expected delivery time of a fragment selects an appropriate fragment in further consideration of a fragment processing time in addition to the expected delivery time of a fragment.

12. The method of claim 1, wherein
the session information further includes a bit rate of a multimedia stream, wherein
the selecting of an appropriate fragment comprises
selecting a latest fragment based on the status of fragment generation, and
the requesting of fragments comprises
comparing its available downlink bandwidth and the bit rate of multimedia stream; and
requesting the latest fragment if the available downlink bandwidth is greater than the bit rate of multimedia stream.

13. The method of claim 2, wherein
the session information further includes data related to a keyframe interval, a bit rate of a multimedia stream, and an encoding type, wherein
the data includes a keyFrame-interval-inSec that indicates a keyframe interval in second or the data includes a framerate and a keyFrame-interval-inFrame that indicates a keyframe interval in frame, and
the encoding type includes constant bit rate (CBR) or variable bit rate (VBR).

14. An apparatus for receiving a stream in a multimedia streaming service, comprising:
a network interface device configured to communicate with other devices through a network; and
a processor connected with the network interface device and configured to select a stream to be received, wherein
the processor is configured to:
request information on a streaming session from an index server;
receive session information from the index server;
calculate a time difference based on the session information;
check a status of fragment generation based on the time difference;
select an appropriate fragment based on the status of fragment generation; and
request fragments from the selected appropriate fragment.

15. The apparatus of claim 14, wherein
the session information includes a time when an initial multimedia stream to be distributed is created, a date when the initial multimedia stream to be distributed is created, a Greenwich mean time (GMT), data related to a keyframe interval, a bit rate of a multimedia stream, and an encoding type, wherein
the data includes a keyFrame-interval-inSec that indicates a keyframe interval in second or the data includes a framerate and a keyFrame-interval-inFrame that indicates a keyframe interval in frame, and
the encoding type includes constant bit rate (CBR) or variable bit rate (VBR).

16. The apparatus of claim 15, wherein
the processor is configured to
calculate the time difference by comparing the time when the multimedia stream to be distributed is created with a current time of the receiving apparatus based on the date and the GMT,
know a period for generating a fragment based on the data; and
determine a latest fragment based on the time difference and the period for generating a fragment.

17. The apparatus of claim 16, wherein
when the data related to a keyframe interval is a keyFrame-interval-inSec that indicates a keyframe interval in second and a value of the KeyFrame-interval-inSec is n,
the processor is configured to know the period for generating a fragment in which a fragment is created in every n seconds based on the keyFrame-interval-inSec; or
when the data related to a keyframe interval is a framerate and a keyFrame-interval-inFrame that indicates a keyframe interval in frame,
the processor is configured to obtain the period for generating a fragment by dividing the keyFrame-interval-inFrame by the framerate.

18. The apparatus of claim 16, wherein
the processor is configured to
select an appropriate fragment in consideration of a size of a fragment, the period for generating a fragment and the bit rate of a multimedia stream.

19. The apparatus of claim 18, wherein
the processor is configured to
deduce an expected delivery time of a fragment based on the size of a fragment and its available downlink bandwidth; and
select an appropriate fragment according to the expected delivery time of a fragment and a fragment processing time so that a next fragment is received before playing of a previous fragment is completed.

20. The apparatus of claim 15, wherein
the processor is configured to
select a latest fragment based on the status of fragment generation,
compare its available downlink bandwidth and the bit rate of multimedia stream; and
request the latest fragment if the available downlink bandwidth is greater than the bit rate of multimedia stream.

* * * * *